United States Patent [19]
Boarin

[11] Patent Number: 5,472,008
[45] Date of Patent: Dec. 5, 1995

[54] AUTOMATIC VALVE FOR GASEOUS FLUIDS, SUITABLE FOR PROTECTING THE PRESSURE REGULATOR FROM THERMAL STRESS AND FROM EXCESS FLOW TO WHICH IT MAY BE SUBJECTED

[75] Inventor: Walter Boarin, Brescia, Italy

[73] Assignee: O.A.R.A. s.r.L., Brescia, Italy

[21] Appl. No.: 201,928

[22] Filed: Feb. 24, 1994

[30] Foreign Application Priority Data

Feb. 24, 1993 [IT] Italy .............................. BS93U0011 U
Aug. 6, 1993 [IT] Italy .............................. BS9300021 U

[51] Int. Cl.⁶ ................................................ F16K 17/40
[52] U.S. Cl. ................................................ 137/75; 137/517
[58] Field of Search ................................ 137/74, 75, 517, 137/613, 72

[56] References Cited

U.S. PATENT DOCUMENTS

| | | | |
|---|---|---|---|
| 2,707,965 | 5/1955 | Allen | 137/75 |
| 3,532,101 | 10/1970 | Snyder, Jr. | 137/75 |
| 3,608,570 | 9/1971 | McKhann et al. | 137/75 |
| 4,088,436 | 5/1978 | Alferes | 137/74 X |
| 4,290,440 | 9/1981 | Sturgis | 137/75 |
| 4,457,329 | 7/1984 | Werley et al. | 137/75 X |
| 4,488,566 | 12/1984 | Hicks | 137/74 |
| 4,727,903 | 3/1988 | Sturgis et al. | 137/75 X |
| 4,792,115 | 12/1988 | Jindra et al. | 137/74 X |
| 4,932,431 | 6/1990 | Silagy | 137/75 X |
| 4,974,623 | 12/1990 | Sturgis | 137/75 X |
| 5,027,845 | 7/1991 | Silagy | 137/75 X |

*Primary Examiner*—John Rivell
*Attorney, Agent, or Firm*—Handal & Morofsky

[57] ABSTRACT

The subject of the present invention is an automatic safety valve for gaseous fluids compressed in cylinders whose supply is controlled by pressure regulators, which is provided with a device protecting against dangerous variations in temperature and against excess flow and which in addition may be adapted to various connection systems between existing cylinders and burners.

12 Claims, 5 Drawing Sheets

5,472,008

AUTOMATIC VALVE FOR GASEOUS FLUIDS, SUITABLE FOR PROTECTING THE PRESSURE REGULATOR FROM THERMAL STRESS AND FROM EXCESS FLOW TO WHICH IT MAY BE SUBJECTED

FIELD OF APPLICATION

The subject of the present invention is a safety valve which, like others, serves to control the supply of gas that is directed to burners from the cylinders in which it is contained and compressed.

PRIOR ART

Various types of safety valves, which are provided in the piping that connects cylinders to burners and where a pressure regulator is always placed between the cylinder and the burner, are well known at the present time. Such valves now also include the subject of the present invention, which is applied for protection against the difficulties that may arise when the cylinder and the regulator are subjected to dangerous thermal stress or when excess flow occurs in the gas pipes (from the regulator to the burner).

One such valve is described in the patent filed in Italy under date of Feb. 24, 1993, by application No. BS 93 U 000011, entitled: "AUTOMATIC SAFETY VALVE FOR GASEOUS FLUIDS, SUITABLE FOR PROTECTING THE PRESSURE REGULATOR AGAINST DANGEROUS THERMAL STRESS OF GREAT INTENSITY TO WHICH IT MAY BE SUBJECTED;" another such valve is described in a second patent, likewise filed in Italy, under date of Aug. 6, 1993, by application No. BS 93 0 0000 21, entitled: "AUTOMATIC SAFETY VALVES FOR GASEOUS FLUIDS COMPLETE WITH DEVICE AGAINST EXCESS FLOW," both by the same owner of the present invention: the firm of O.A.R.A. s.r.l. of Travagliato, BS.

OBJECTS AND ADVANTAGES OF THE INVENTION

The object of this invention was to meet the requirements of users and installers, who must never find themselves in difficult and dangerous situation.

Such requirements were given a great deal of consideration in the study and development of these valves, so that they might offer novel advantages and ensure better safety conditions, even in the face of dangerous situations deriving from gas leaks, excessive proximity to sources of heat, defective operation of the components that control flow of the gas and therefore of piping, cocks, regulators, gaskets, etc.

DRAWINGS

For better understanding of this invention, a more detailed description thereof, drawn up pursuant to a preferred embodiment, now follows, with reference to the accompanying drawings, wherein FIG. 1 shows the section of the valve A for protection against thermal stress;

DESCRIPTION WITH REFERENCE TO DRAWINGS

The figures show the valve and the parts constituting it, as well as its refinement and alternative accomplishments, which it is intended to describe and claim hereinbelow.

Figure 1:
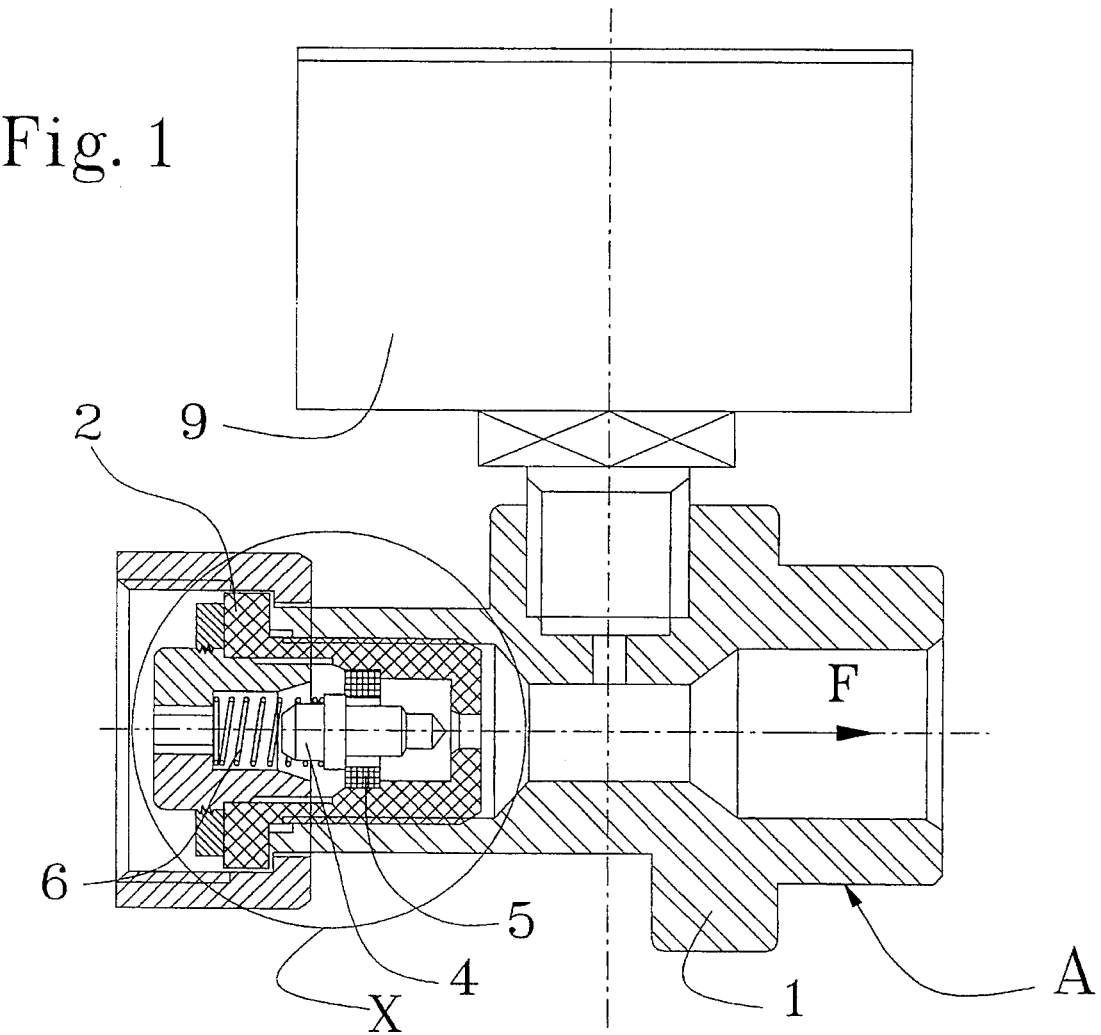
Figure 2:
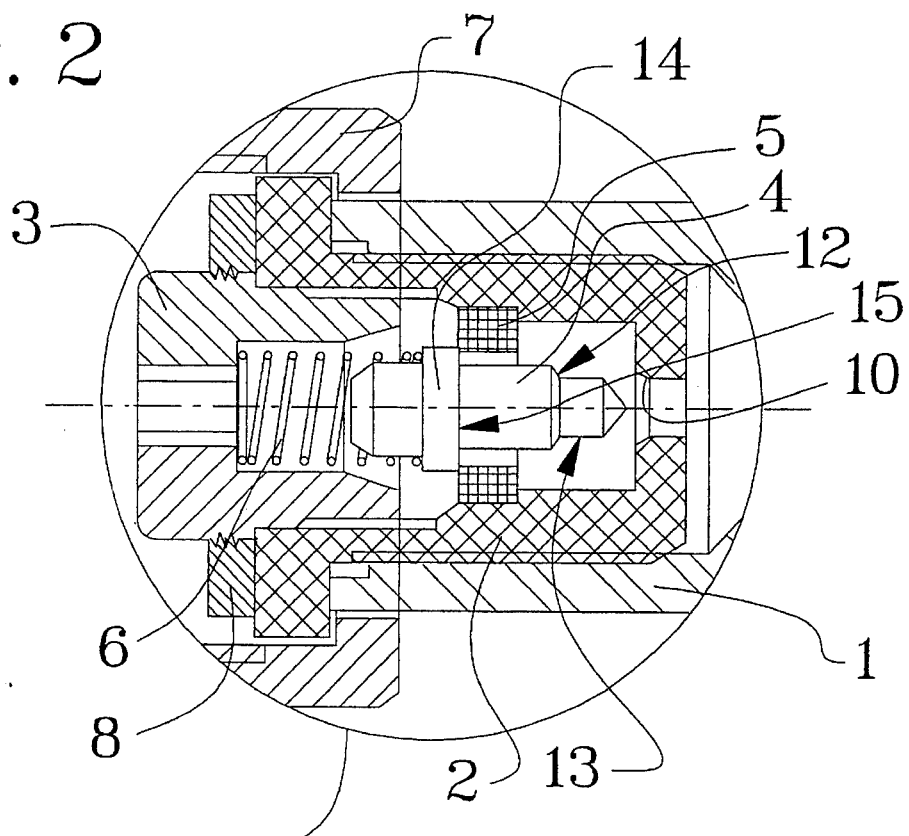
FIG. 2 is an enlarged view of the portion within the circle X in FIG. 1.
Figure 3:
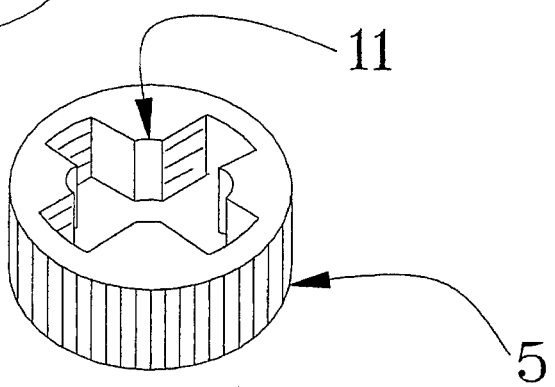
FIG. 3 is the meltable element, seen in perspective.

The meltable element 5, preferably in semirigid ABS, which melts between 100 and 150 C., is noted in the first two figures. When the pressure regulator with which the gas cylinder is fitted is subjected to intense heat, the said element melts and causes interruption of the flow of gas directed to the pressure regulator, accomplishing the safety functions of the valve. In this case, the gas, instead of escaping and spreading into the environment, remains blocked by the plug 4 which has been released by the meltable element 5 seen in FIG. 3 and seated in the threaded bushing 2, arranged in the cavity of the body 1, before the pressure gauge 9. The said element 5, at normal temperature and by means of the plane 15 of the collar 14, holds the plug 4, which is constantly pressed against its projections 11 by the spring 6, in the proper position, leaving the gas free to pass from the cylinder to the regulator, in the direction indicated by the arrow F (see FIG. 1).

When the regulator is subjected to dangerous excess heat, the aforesaid projections 11 soften or melt, allowing the element 4 to slide, which closes the gas passage by means of the tapered projection 12 when the latter reaches the seat of closure 10, guided by the cylindrical extension 13.

The gasket 8, which does not melt, ensures closure of the line between the cylinder and the element 2, seat of the plug 4. The said gasket, of a material that withstands high temperatures, is fitted on the head of the stopper 3, provided with grooves which improve its adhesion and hold when it is pressed by the hollow nut 7 on the connection that joins the valve to the cylinder.

Figure 4:
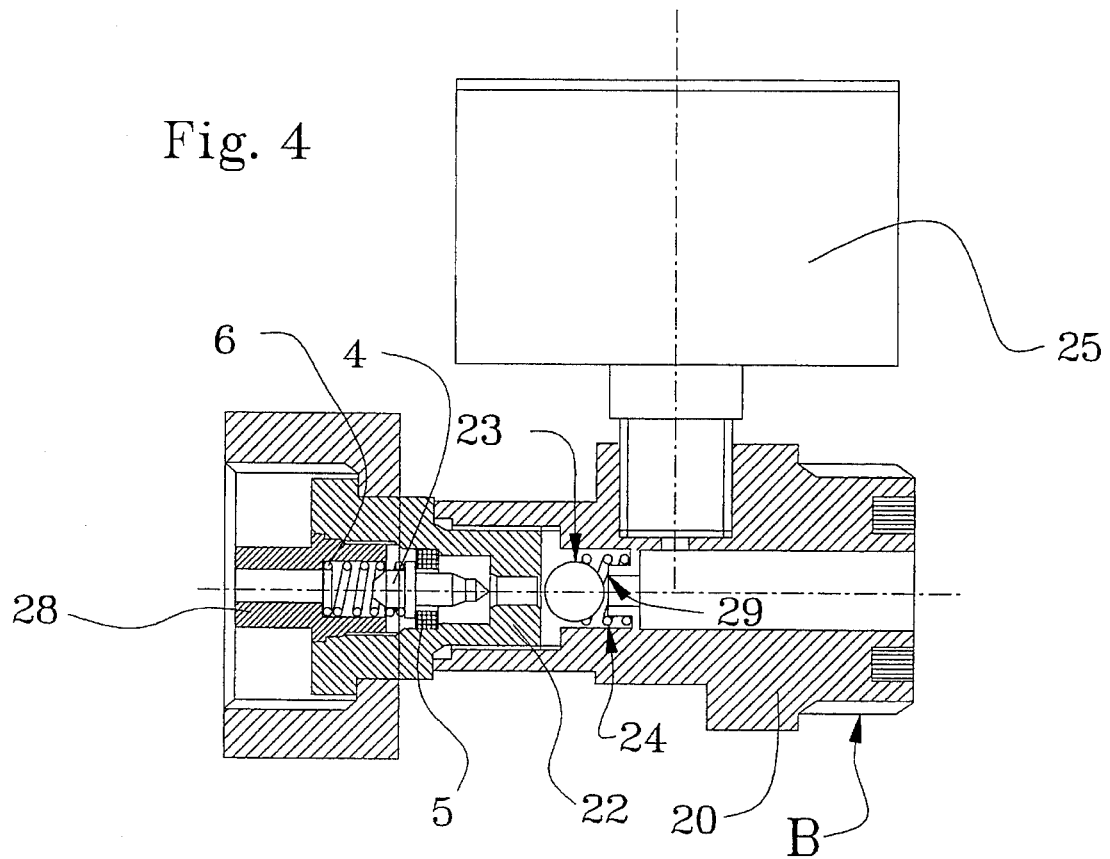
FIG. 4 is the section of the valve B for protection against thermal stress and excess flow.

Another accomplishment consists in the development of the valve labelled B, which, as FIG. 4 indicates, alternatively comprises the element for protection against excess flow which, in addition to the elements described above, comprises the sphere 23, contained in the cavity of the body 20, pressed by the spring 24 which keeps it separated from the sealing seat 29 and in the space limited by the connection 22.

In the cavity of the connection 22, there are arranged the meltable element 5, the plug 4 and the spring 6, held in the proper position by the connection 28.

In the valve under examination, the sphere 23 moves when an excess flow of gas occurs, for example, when there is a leak of gas from the tube, (usually) of rubber, which connects the regulator to the burner, or because the sealing action of a tube-pinching band ceases. In these and in other cases, the sphere 23 reaches the sealing seat 29 of the body 20, plugging it, and this because the sphere is pressed by the pressure that compresses the spring 24.

This valve incorporates the abovementioned safety elements which consist of: the element 5 in the retaining ring 22, together with the plug 4 and the spring 6; the sphere 23, pressed by the spring 24, arranged between the retaining ring 22 and the sealing seat of the hole 29 of the body 20 and where said sphere, located before the pressure gauge 25, controls the pressure of the gas coming out of the cylinder.

The valve described and illustrated above is therefore an improvement and refinement of the valve A, previously detailed.

Alternatively to the valves A and B, considered above, others, which possess only the functional features of these and may instead be applied to cylinders and regulators by a variety of attachments, are described below.

Figure 6:
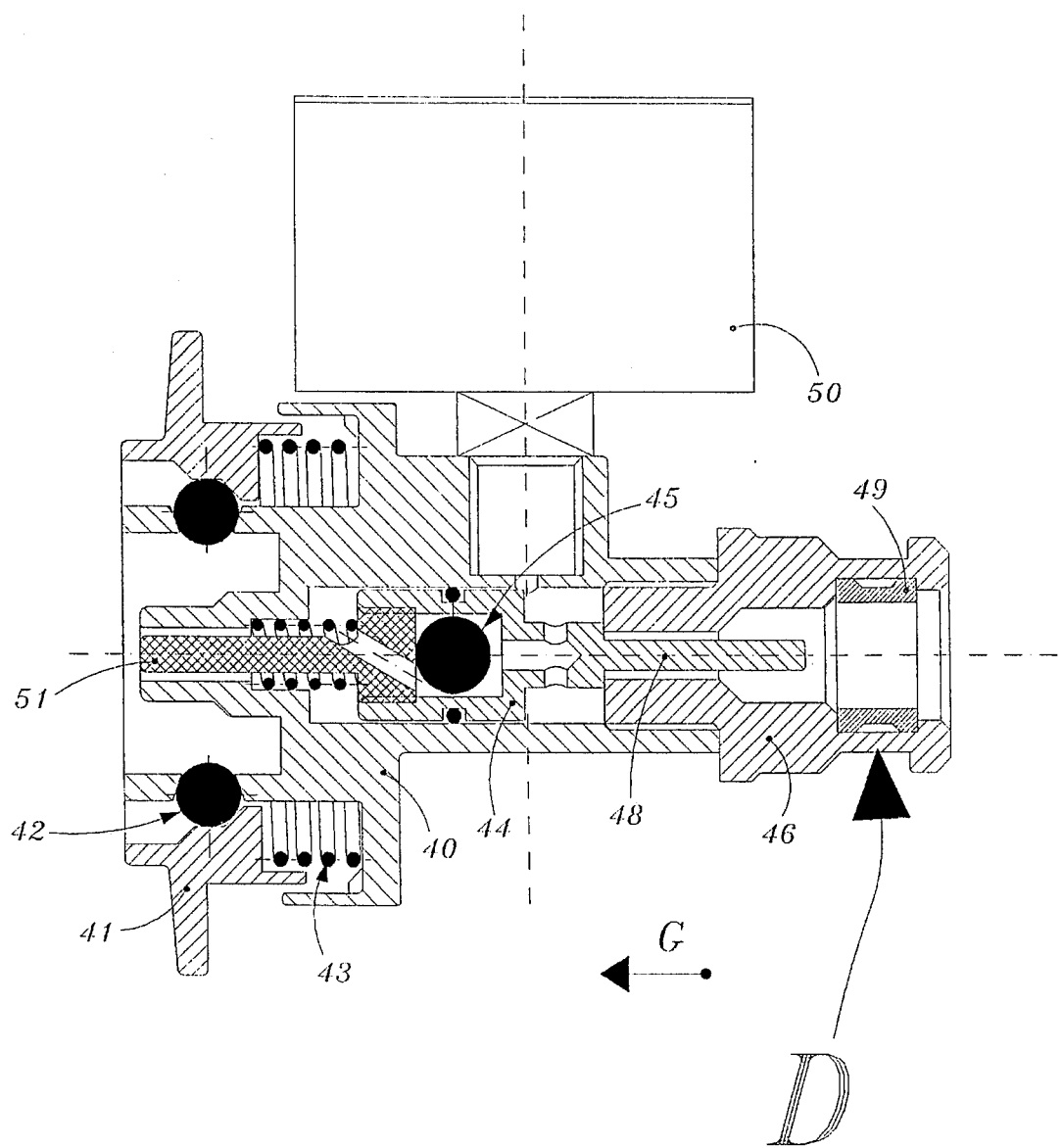

As FIG. 6 shows, the valve labelled C is likewise provided with elements 4, 5 and 6 and the sphere 23 with spring 24, arranged as in the valves seen previously.

Figure 5:
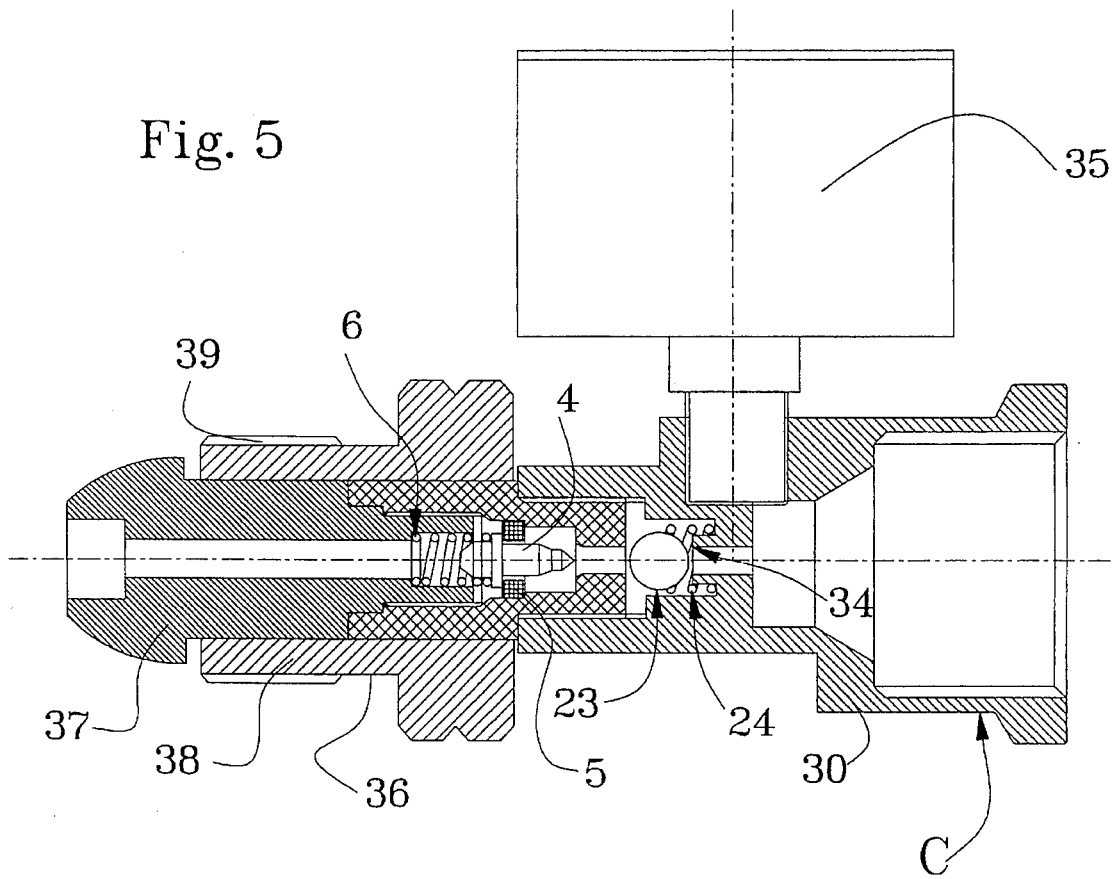
FIGS. 5 and 6 are the sections of the valves C and D which, provided with the safety components mentioned above, are designed to be applied to cylinders variously equipped.

In this valve, the sphere 23 is free and contained in the smallest cavity of the body 30, pressed by the spring 24 which keeps it separated from the sealing seat 34; it remains in its active space, held by the locking bushing 36; wherein are arranged: the meltable element 5, the plug 4 and the spring 6, held by the ferrule with ogival head 37. The said ferrule with ogival head 37 is a special attachment that is adapted to the cylinders and regulators supplied with it. As FIG. 5 shows, the ferrule with ogival attachment 37 is joined to the locking bushing 36 by means of a screw thread and the two guide the nut with extension 38, provided with screw thread 39, which joins the fastening screw thread of the cylinder, of course equipped to accommodate the above-mentioned ogival head. This valve likewise has a pressure gauge 35 arranged like the model previously seen.

Another novel safety valve, labelled D in FIG. 6, although designed differently from those described, functions like them, providing the same assurances.

The body 40 of this valve differs from the bodies of the valves seen previously; joined to it in addition is the connection 46 which contains the gasket 49, necessary for its connection to the pressure regulator; when the regulator is connected to it, the valve opens for passage of the gas coming from the cylinder. The body 40 is still connected to the cylinder, fitted so as to be connected and remain connected to the latter by means of the small spheres 42, inserted in the meltable element 41, made of plastic. This element 41 is pressed and kept pressed by the spiral spring 43 in the direction indicated by the arrow G, which causes the spheres 42 to hold it firmly in the proper position.

When the valve is inserted into the cylinder connection, union of the cylinder with the regulator is obtained, which is maintained by the thrust of the spring 43, which likewise keeps the elements 51 and 48 inserted in their seats where they cause opening of the passages for the gas coming from the cylinder. When the element 41 melts because of overheating (as stated for the other valves), the spring 43 intervenes, separating the elements left without support of the springs, and the gas stops flowing from the cylinder, because the element 51 separates from it and from the part that, when pressed, started passage.

This valve, too, has a pressure gauge 50 arranged between the element 44, which accommodates the sphere 45, and the connection 46.

While an illustrative embodiment of the invention has been described above, it is, of course, understood that various modifications will be apparent to those of ordinary skill in the art. Such modifications are within the spirit and scope of the invention, which is limited and defined only by the appended claims

I claim:

1. An automatic valve for gaseous fluids, suitable for protecting a pressure regulator from thermal stress, comprising:

a) a bushing member defining a hollow interior and a gas passage through-hole for passing a gas from the hollow interior and through the gas passage through-hole;

b) a plug having a body portion, a collar disposed towards one end of the body portion and a tapered sealing projection disposed at an opposite end of the body portion, the tapered sealing projection being operable for extending into and sealing the gas-passage through-hole;

c) a spring member for applying an urging force on the plug in an urging direction for extending the tapered sealing projection into the gas-passage through-hole; and d) an intermediate heat deformable plastic element disposed annularly around the body portion, in a normal state the intermediate heat deformable plastic element being disposed adjacent with the collar and having a stiffness so as to be effective in co-action with the collar for retaining the plug against the urging force, in a heated state, the intermediate heat deformable plastic element being deformable so as to enable the collar to pass through and allow the tapered sealing projection to extend into and seal the gas-passable through-hole;

wherein the intermediate heat deformable plastic element defines a cross-shaped pass-through hole with retaining projections for contacting and retaining the collar, the retaining projections being deformable at a predetermined temperature so as to bend due to the urging force exerted through the collar to enable the collar to pass through the intermediate heat deformable plastic element and allow the tapered projection to extend into and seal the gas passage through-hole.

2. An automatic valve according to claim 1; wherein the bushing member further defines a tapered sealing seat surface integral with the gas-passage through hole, the tapered sealing seat surface being effective for receiving and engaging with the tapered sealing projection to seal the gas-passage through-hole when the tapered sealing projection is extended into the gas-passage through-hole.

3. An automatic valve according to claim 1 further comprising guiding means disposed in the hollow interior of the bushing member for supporting and guiding at least one of the plug and the spring member in the urging direction.

4. An automatic valve according to claim 1; further comprising excess flow preventing means for preventing an excess flow of a gas through the automatic valve including a body member defining a flow chamber in communication at one end with the gas-passage through-hole and having a gas flow through-hole defined by the body member at an opposite end of the flow chamber, and sealing means operable in response to an excess flow of the gas above a predetermined maximum for sealing the gas flow through-hole and preventing the excess flow of the gas through the automatic valve.

5. An automatic valve according to claim 4; wherein the sealing means comprises a spherical member disposed in the flow chamber and a spring member for urging the spherical member away from the gas flow through-hole, the spring member having a spring constant effective for keeping the spherical member away from the gas flow through-hole during normal gas flow conditions and allowing the spherical member to move toward and seal the gas flow through-hole during excess gas flow conditions.

6. An automatic valve according to claim 1; wherein the intermediate heat deformable plastic element comprises a semi-rigid ABS plastic.

7. An automatic valve for gaseous fluids, comprising:

a) a bushing member defining a hollow interior and a gas passage through-hole for passing a gas from the hollow interior and through the gas passage through-hole;

b) a plug disposed in the hollow interior and having a longitudinal axis, a middle body portion having a diameter, a collar portion disposed towards one end of the plug and having a diameter that is larger than the diameter of the body portion, and a sealing end disposed at another end of the plug and operable in a safety operation for extending into and plugging the gas passage through-hole;

c) an urging member for urging the plug in a direction along the longitudinal axis and toward the gas passage through-hole; and d) a retaining member having a stiff hardened state and a deformable softened state depending on temperature, the retaining member defining an opening and being annularly disposed around the middle body portion of the plug between the collar and the sealing end, the retaining member in the normal stiff hardened state being effective to retain the collar from passing through the opening so as to prevent the sealing portion from extending into the gas passage through-hole thereby allowing the gas to pass from the hollow interior and through the gas passage through-hole, the retaining member in the safety softened state being effective to allow the collar to pass through the opening so as to allow the urging force to automatically extend the sealing end in the safety operation into and seal the gas passage through-hole so as to prevent the gas from passing from the hollow interior and through the gas passage hole;

wherein the retaining member defines a cross-shaped pass-through hole with retaining projections for contacting and retaining the collar, the retaining projections being deformable at a predetermined temperature so as to bend due to the urging force exerted through the collar to enable the collar to pass through the retaining member and allow the sealing end to extend into and seal the gas passage through-hole.

8. An automatic valve according to claim 7 wherein the retaining member comprises a semirigid ABS plastic.

9. An automatic valve according to claim 7 wherein the bushing member further defines a tapered sealing seat surface integral with the gas-passage through-hole, the tapered sealing seat surface being effective for receiving and engaging with the sealing end to seal the gas-passage through-hole when the sealing end is extended into the gas-passage through-hole.

10. An automatic valve according to claim 7 further comprising guiding means disposed in the hollow interior of the bushing member for supporting and guiding at least one of the plug and the urging member in an urging direction.

11. An automatic valve according to claim 7 further comprising excess flow preventing means for preventing an excess flow of a gas through the automatic valve including a body member defining a flow chamber in communication at one end with the gas-passage through-hole and having a gas flow through-hole defined by the body member at an opposite end of the flow chamber, and sealing means operable in response to an excess flow of the gas above a predetermined maximum for sealing the gas flow through-hole and preventing the excess flow of the gas through the automatic valve.

12. An automatic valve according to claim 11; wherein the sealing means comprises a spherical member disposed in the flow chamber and a spring member for urging the spherical member away from the gas flow through-hole, the spring member having a spring constant effective for keeping the spherical member away from the gas flow through-hole during normal gas flow conditions and allowing the spherical member to move toward and seal the gas flow through-hole during excess gas flow conditions.

* * * * *